(12) United States Patent
Lee et al.

(10) Patent No.: US 7,463,953 B1
(45) Date of Patent: Dec. 9, 2008

(54) METHOD FOR DETERMINING A TILT ANGLE OF A VEHICLE

(75) Inventors: Jonathan Lee, Puyallup, WA (US);
Daniel Rosario, Santa Cruz, CA (US);
Arne Stoschek, Palo Alto, CA (US);
Knut Sanny, Walle (DE)

(73) Assignees: Volkswagen AG, Wolfsburg (DE);
Volkswagen of America, Inc., Auburn Hills, MI (US)

( * ) Notice: Subject to any disclaimer, the term of this patent is extended or adjusted under 35 U.S.C. 154(b) by 0 days.

(21) Appl. No.: 11/821,318

(22) Filed: Jun. 22, 2007

(51) Int. Cl.
*G06F 7/70* (2006.01)

(52) U.S. Cl. .............................. 701/1; 701/70

(58) Field of Classification Search .............. 701/1, 701/29, 33, 35, 36, 37, 41, 70
See application file for complete search history.

(56) References Cited

U.S. PATENT DOCUMENTS

| 6,178,375 | B1 | 1/2001 | Breunig |
|---|---|---|---|
| 6,259,999 | B1 | 7/2001 | Pantle |
| 6,399,941 | B1 | 6/2002 | Nakagaki et al. |
| 6,516,665 | B1 | 2/2003 | Varadan et al. |
| 6,634,113 | B1 | 10/2003 | Almaraz et al. |
| 6,856,884 | B2 | 2/2005 | Traylor |
| 7,408,453 | B2 * | 8/2008 | Breed .................... 340/442 |
| 7,421,321 | B2 * | 9/2008 | Breed et al. .............. 701/29 |
| 2002/0022924 | A1 | 2/2002 | Begin |
| 2005/0256675 | A1 | 11/2005 | Kurata |

FOREIGN PATENT DOCUMENTS

| DE | 197 32 081 A1 | 1/1999 |
|---|---|---|
| EP | 0 769 701 B1 | 4/1997 |
| EP | 0 928 258 B1 | 7/1999 |
| JP | 2003 065 793 A | 3/2003 |

\* cited by examiner

*Primary Examiner*—Richard M. Camby
(74) *Attorney, Agent, or Firm*—Manfred Beck, P.A.

(57) ABSTRACT

A method for determining a tilt angle of a vehicle includes measuring accelerations of a vehicle in directions along a longitudinal axis, a transverse axis, and a vertical axis of the vehicle. A current tilt angle of the vehicle is calculated as a function of the measured accelerations. A magnitude-compensated tilt angle is calculated as a function of the current tilt angle, of a preceding tilt angle, and of the magnitude of the vector sum of the measured accelerations. A gyroscopically stabilized magnitude-compensated tilt angle is calculated as a function of the current tilt angle, of a preceding tilt angle, of the magnitude of the vector sum of the measured accelerations, and of a change in the tilt angle over a given time period calculated from angular rate data provided by a gyroscope.

10 Claims, 5 Drawing Sheets

METHOD FOR DETERMINING A TILT ANGLE OF A VEHICLE

BACKGROUND OF THE INVENTION

Field of the Invention

The invention relates to a method for determining a tilt angle of a vehicle.

Gravity-referenced tilt sensors, such as accelerometers or electrolytic sensors, are subject to the coupling of sensed tilt angles and acceleration effects. These acceleration effects introduce errors in the sensed tilt angle. When used for automotive applications, maneuvers such as vehicle acceleration, braking, and centrifugal forces while turning introduce an error in the sensed tilt angle in a manner that is similar to water sloshing in a bucket. The sensed acceleration due to gravity and vehicle accelerations have an additive effect. The error in the resultant vector can for example vary by over 20 degrees in a vehicle that accelerates from 0-100 km/h.

Mechanical tilt sensors used in automotive products generally include a weighted ball suspended in liquid. The weighted ball is allowed to rotate, and usually reports tilt angles with an accuracy of +/−5 degrees. A dynamic compensation in this type of mechanical sensor is achieved through its slow response. Further known are electrolytic inclinometers and low-cost inclinometers for laboratory applications that provide high accuracy but do not provide dynamic compensation. Low cost accelerometer-based tilt sensors are often used for a detection of a tilt in gaming applications, but generally, these low-cost accelerometer-based tilt sensors provide no dynamic compensation. Tilt sensors with dynamic compensation are used in avionics applications. These dynamic tilt sensors utilize gyroscopic sensors in addition to accelerometers and they use computational algorithms to provide compensation.

U.S. Pat. No. 6,259,999 B1 discloses a method and a device for determining an inertial state of a vehicle. The inertial state of the vehicle can be determined independently of dynamic vehicle movements by measuring the accelerations of the vehicle in the direction of its longitudinal, transverse and vertical axes. The measured acceleration components are filtered in order to filter out small disturbances of the individual acceleration components. A suitable filter is for example a median filter or some other digital filter with a low-pass characteristic. In a median filter, each acceleration component is sampled over a certain time interval and all of the sampled values are subdivided into several data tupels. For each data tupel, the average sampled value is determined. A resulting acceleration vector is formed from the filtered acceleration components and the magnitude of the resulting acceleration vector is determined. The magnitude of the resulting acceleration vector is subjected to a threshold decision with a window that is delimited by a threshold lying above and a threshold lying below the gravitational acceleration. A current course angle of the vehicle with respect to its longitudinal axis and/or the current course angle with respect to its transverse axis is then determined only if the magnitude of the acceleration vector lies inside the window. Otherwise, the previously determined course angles are retained. A disadvantage of the method disclosed in U.S. Pat. No. 6,259,999 B1 is that a dynamic vehicle movement may cause the magnitude of the acceleration vector to fall outside the window for an extended period. In such a case, the determination of the inertial state of the vehicle may be unreliable, because the determination of the inertial state is based solely on old and possibly outdated course angles.

U.S. Patent Application Publication No. 2002/0022924 A1 discloses a method for propagating a position of a vehicle utilizing a multi-axis accelerometer for determining the pitch and roll of the vehicle and utilizes the calculated pitch and roll to propagate the position of the vehicle with the acceleration signals from the multi-axis accelerometer. Pitch and roll of the vehicle are determined by comparing information from the multi-axis accelerometer to other speed and/or heading information, such as GPS (Global Positioning System) information and/or an analysis of map matching information. The pitch and roll of the vehicle can also be determined solely by the multi-axis accelerometer when GPS velocity information and map matching information is not available. The pitch and roll of the vehicle is determined by the multi-axis accelerometer when gravity is substantially the only acceleration acting upon the multi-axis accelerometer. When the resultant vector from the orthogonal accelerometers and the multi-axis accelerometer is substantially 1 G (acceleration of gravity) and is substantially constant for a period of several seconds, the pitch and roll of the vehicle can be determined by comparison of the vehicle axes to the 1 G resultant vector. A disadvantage of the method disclosed in U.S. Patent Application Publication No. 2002/0022924 A1 is that if no GPS information is available, then the pitch and roll can only be determined if there are no disturbances, i.e. if the resultant vector from the orthogonal accelerometers and the multi-axis accelerometer is substantially 1 G and is substantially constant for a period of several seconds.

U.S. Pat. No. 6,178,375 B1 discloses a method for determining rotational position angles of a vehicle by measuring accelerations of the vehicle in the x, y and z directions and calculating position angle values from the measured accelerations using two algorithms. Inertial position angles are determined by selecting the smaller of first position angle values and of second position angle values because the smaller position angle values have a higher likelihood of corresponding to the actual inertial position of the vehicle than the greater positional angle calculated. Corresponding rotation rates of the vehicle are measured and the respective rotational position angles are determined by integrating corresponding rotation rates with the respective inertial position angles as initial values.

SUMMARY OF THE INVENTION

It is accordingly an object of the invention to provide a method for determining a tilt angle of a vehicle which overcomes the above-mentioned disadvantages of the heretofore-known methods of this general type. It is in particular an object of the invention to provide a method for determining a tilt angle such that the sensed vehicle tilt angle is stable enough for applications such as a real-time display of actual vehicle roll and pitch angles. Another object of the invention is to provide a method for determining a tilt angle of a vehicle that decouples gravitational and lateral accelerations for low-cost tilt sensing in automotive applications.

With the foregoing and other objects in view there is provided, in accordance with the invention, a method for determining a tilt angle of a vehicle, which includes the steps of:

providing acceleration measurement values by measuring accelerations of the vehicle in directions along an X-axis, a Y-axis, and a Z-axis, the X-axis, the Y-axis, and the Z-axis being substantially perpendicular with respect to one another;

calculating a current tilt angle of the vehicle as a function of the acceleration measurement values;

calculating a magnitude of a vector sum of the accelerations of the vehicle in the directions along the X-axis, the Y-axis, and the Z-axis; and calculating a compensated tilt angle as a function of the current tilt angle, which is calculated from the acceleration measurement values, of at least one preceding tilt angle, and of the magnitude of the vector sum of the accelerations in the directions along the X-axis, the Y-axis, and the Z-axis such that the at least one preceding tilt angle is used for calculating the compensated tilt angle if the magnitude of the vector sum of the accelerations in the directions along the X-axis, the Y-axis, and the Z-axis is substantially different from a magnitude of a gravitational acceleration.

An advantage of the above-defined method is that it can determine whether current sensor information is inaccurate and, in case the current sensor information is inaccurate, can compensate for the inaccurate current sensor information by relying at least to some degree on past sensor information. A further advantage of the method according to the invention is that it is suitable for low-cost embedded applications and that it does not require complex computation in real time. Another advantage of the above-defined calculation method is that it provides highly accurate tilt information in static situations and that it is resistant to dynamic disturbances.

Another mode of the method according to the invention includes the steps of measuring the accelerations of the vehicle in directions along the X-axis, the Y-axis, and the Z-axis such that the X-axis is substantially parallel to a longitudinal axis of the vehicle, the Y-axis is substantially parallel to a transverse axis of the vehicle and the Z-axis is substantially parallel to a vertical axis of the vehicle; and calculating the current tilt angle of the vehicle as a function of the acceleration measurement values by calculating a current roll angle as a function of accelerations of the vehicle in directions along the Y-axis and along the Z-axis and by calculating a current pitch angle as a function of accelerations of the vehicle in directions along the X-axis and along the Z-axis.

A further mode of the method according to the invention includes the steps of calculating the compensated tilt angle by calculating a compensated roll angle and a compensated pitch angle; calculating the compensated roll angle as a function of the current roll angle, of at least one preceding roll angle and of the magnitude of the vector sum of the accelerations in the directions along the X-axis, the Y-axis, and the Z-axis; and calculating the compensated pitch angle as a function of the current pitch angle, of at least one preceding pitch angle and of the magnitude of the vector sum of the accelerations in the directions along the X-axis, the Y-axis, and the Z-axis.

Another mode of the method according to the invention includes the steps of using a gyroscope for providing angular rate data; calculating a change in a roll angle and a change in a pitch angle over a given time period by using the angular rate data provided by the gyroscope; calculating the compensated roll angle as a function of the current roll angle, which is calculated from the acceleration measurement values, of at least one preceding roll angle, of the magnitude of the vector sum of the accelerations in the directions along the X-axis, the Y-axis, and the Z-axis, and of the change in the roll angle over the given time period, which is calculated from the angular rate data, such that the at least one preceding roll angle and the change in the roll angle over the given time period are used for calculating the compensated roll angle if the magnitude of the vector sum of the accelerations in the directions along the X-axis, the Y-axis, and the Z-axis is substantially different from the magnitude of the gravitational acceleration; and calculating the compensated pitch angle as a function of the current pitch angle, which is calculated from the acceleration measurement values, of at least one preceding pitch angle, of the magnitude of the vector sum of the accelerations in the directions along the X-axis, the Y-axis, and the Z-axis, and of the change in the pitch angle over the given time period, which is calculated from the angular rate data, such that the at least one preceding pitch angle and the change in the pitch angle over the given time period are used for calculating the compensated pitch angle if the magnitude of the vector sum of the accelerations in the directions along the X-axis, the Y-axis, and the Z-axis is substantially different from the magnitude of the gravitational acceleration.

An advantage of determining a change in a roll angle and a change in a pitch angle by using a gyroscope is that the tracking behavior of the tilt sensor is improved.

A further mode of the method according to the invention includes the step of calculating the compensated roll angle and the compensated pitch angle by using the following relations:

Roll($t$)=Roll($t$−1)×(1−CompensationFactor)+YZ_angle×(CompensationFactor), and

Pitch($t$)=Pitch($t$−1)×(1−CompensationFactor)+XZ_angle×(CompensationFactor)

wherein Roll(t) denotes the compensated roll angle, Pitch(t) denotes the compensated pitch angle, Roll(t−1) denotes a preceding roll angle, Pitch(t−1) denotes a preceding pitch angle, YZ_angle denotes the current roll angle which is a function of accelerations of the vehicle in directions along the Y-axis and along the Z-axis, XZ_angle denotes the current pitch angle which is a function of accelerations of the vehicle in directions along the X-axis and along the Z-axis, and CompensationFactor denotes a compensation factor having a value in a range between zero and one.

A further mode of the method according to the invention includes the step of calculating the compensation factor by using the following relations:

$$\text{Magnitude}=\sqrt{(X\_\text{acceleration})^2+(Y\_\text{acceleration})^2+(Z\_\text{acceleration})^2},$$

and $$CompensationFactor = \frac{1}{1+|Magnitude-1|}$$

wherein Magnitude denotes the magnitude of the vector sum of the accelerations in the directions along the X-axis, the Y-axis, and the Z-axis, wherein X_acceleration, Y_acceleration, and Z_acceleration denote respective accelerations along the X-axis, the Y-axis and the Z-axis in multiples of the magnitude of the gravitational acceleration.

Another mode of the method according to the invention includes the step of calculating the compensated roll angle and the compensated pitch angle by using the following relations:

Roll($t$)=(Roll($t$−1)+XGyroIntegral)×(1−CompensationFactor)+YZ_angle×(CompensationFactor), and Pitch($t$)=(Pitch($t$−1)+YGyroIntegal)×(1−CompensationFactor)+XZ_angle×(CompensationFactor)

wherein Roll(t) denotes the compensated roll angle, Pitch(t) denotes the compensated pitch angle, Roll(t−1) denotes a preceding roll angle, Pitch(t−1) denotes a preceding pitch angle, YZ_angle denotes the current roll angle which is a function of accelerations of the vehicle in directions along the Y-axis and along the Z-axis, XZ_angle denotes the current pitch angle which is a function of accelerations of the vehicle in directions along the X-axis and along the Z-axis, XGyroIntegral and YGyroIntegral denote a respective change in the roll angle and the pitch angle over the given time period as a function of the angular rate data provided by the gyroscope.

A further mode of the method according to the invention includes the step of calculating the change in the roll angle and the change in the pitch angle over the given time period by using the following relations:

$$XGyroIntegral = \left( \frac{XGyroMeasurement(t) + XGyroMeasurement(t-1)}{2} \right) \times \Delta Time,$$

and $$YGyroIntegral = \left( \frac{YGyroMeasurement(t) + YGyroMeasurement(t-1)}{2} \right) \times \Delta Time$$

wherein XGyroIntegral denotes the change in the roll angle over the given time period ΔTime, YGyroIntegral denotes the change in the pitch angle over the given time period ΔTime, XGyroMeasurement(t), XGyroMeasurement(t−1), YGyroMeasurement(t), and YGyroMeasurement(t−1) are angular rate data provided by the gyroscope.

Another mode of the method according to the invention includes the step of calculating the compensation factor by using the following relations:

Magnitude=
$$\sqrt{(X\_acceleration)^2 + (Y\_acceleration)^2 + (Z\_acceleration)^2},$$
and $$CompensationFactor = \frac{1}{1 + |Magnitude - 1|}$$

wherein Magnitude denotes the magnitude of the vector sum of the accelerations in the directions along the X-axis, the Y-axis, and the Z-axis, wherein X_acceleration, Y_acceleration, and Z_acceleration denote respective accelerations along the X-axis, the Y-axis and the Z-axis in multiples of the magnitude of the gravitational acceleration.

A further mode of the method according to the invention includes the step of displaying tilt angle information by displaying roll angle information and pitch angle information on a display in the vehicle.

Other features which are considered as characteristic for the invention are set forth in the appended claims.

Although the invention is illustrated and described herein as embodied in a method for determining a tilt angle of a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
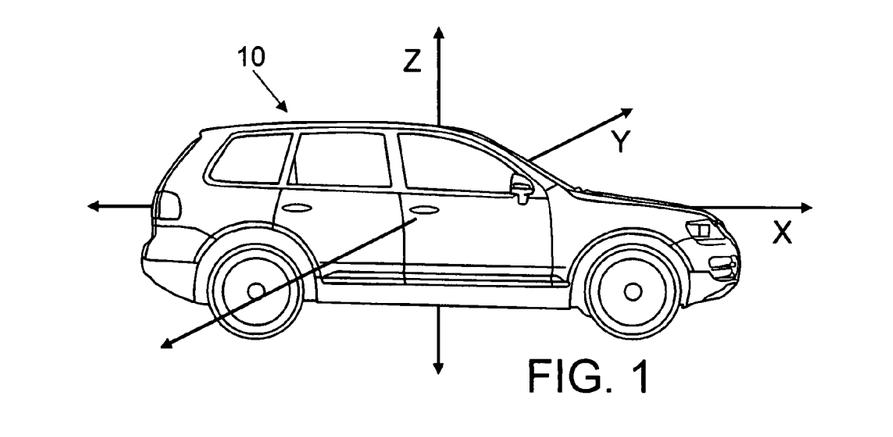
FIG. 1 is a schematic view of a vehicle for illustrating the orientation of an X-axis, a Y-axis, and a Z-axis with respect to the vehicle in accordance with the invention.

Referring now to the figures of the drawings in detail and first, particularly, to FIG. 1 thereof, there is shown a vehicle 10. FIG. 1 illustrates the vehicle X-axis, the vehicle Y-axis and the vehicle Z-axis which are perpendicular with respect to one another. The X-axis is the longitudinal axis of the vehicle 10. The Y-axis is the transverse axis of the vehicle 10 and the Z-axis is the vertical axis. Roll, pitch and yaw motions are defined as rotations about the X-axis, Y-axis, and Z-axis. The vehicle 10 has a tilt sensor unit 12 for determining roll and pitch information for the vehicle 10. The tilt sensor unit 12 is connected to a display 14 which displays the roll and pitch information.

Figure 2:
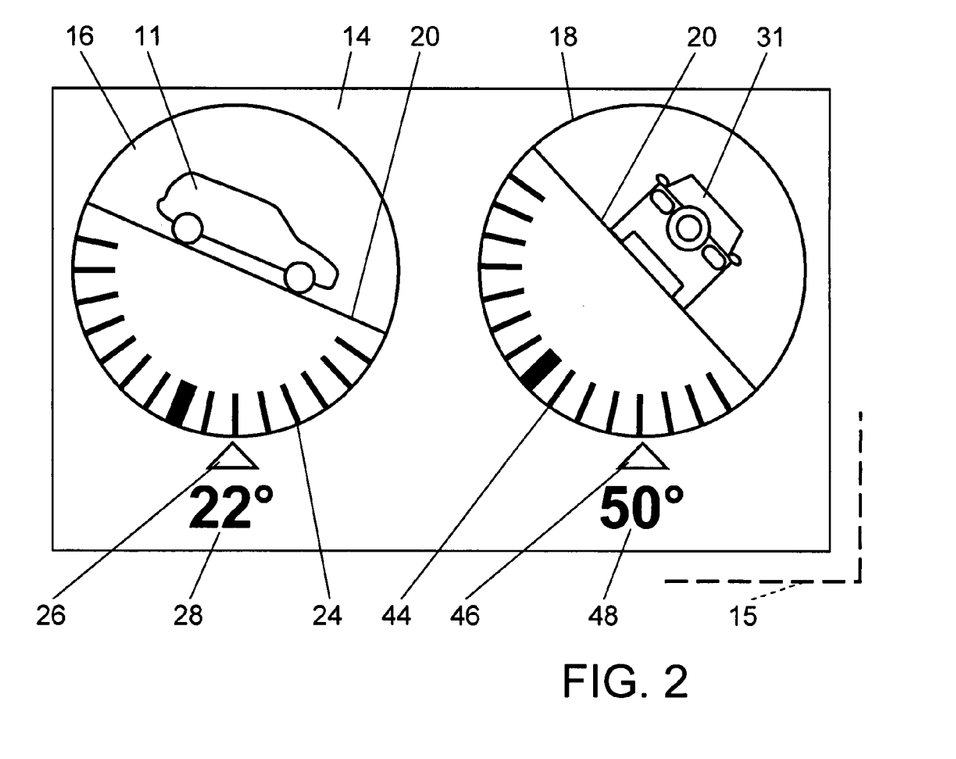
FIG. 2 is a diagrammatic view of a display provided in the vehicle for presenting pitch and roll information in accordance with the invention.

FIG. 2 is a diagrammatic view of a display 14 which is provided in the vehicle 10 for presenting pitch and roll information to the driver of the vehicle 10. The display 14 may be provided in an instrument cluster 15 of the vehicle 10. The instrument cluster 15 of the vehicle 10 is only schematically indicated by a dashed line. In addition to the display 14 which provides roll and pitch information, the instrument cluster 15 may include a speedometer, an odometer and further displays for providing information for the driver. The display 14 has a pitch information indicator 16 and a roll information indicator 18. The pitch information indicator 16 has the shape of a circular disk and shows a pictogram 11 of the vehicle 10 in a side view on a driving surface 20. Along the circumference of the lower portion of the pitch information indicator 16 are pitch angle indicator marks 24. The pictogram 11 of the vehicle 10 on the driving surface 20 together with the pitch indicator marks 24 rotate such that the pitch of vehicle pictogram shown in the pitch information indicator 16 corresponds to the pitch angle of the vehicle 10.

Underneath the circular disk is a fixed indicator triangle 26 for indicating a pitch angle. Underneath the indicator triangle 26 is a numerical display 28 which displays the pitch angle in degrees. The roll information indicator 18 is shown as a circular disk with a pictogram 31 of the vehicle 10 on a driving surface 20. Along the circumference of the lower portion of the roll information indicator 18 are roll angle indicator marks 44. The pictogram 31 of the vehicle 10 on the driving surface 20 together with the roll indicator marks 44 rotate such that the roll angle of vehicle pictogram 31 shown in the roll information indicator 18 corresponds to the roll angle of the vehicle 10. Underneath the circular disk is a fixed indicator triangle 46 for indicating a roll angle. Underneath the indicator triangle 46 is a numerical display 48 which displays the roll angle in degrees.

Figure 3:
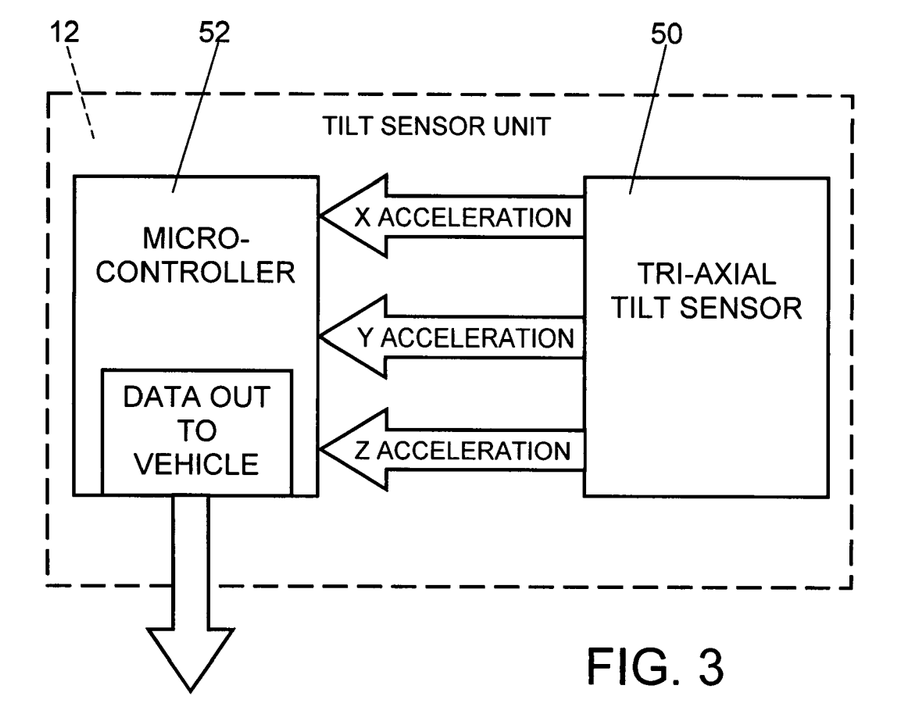
FIG. 3 is a block diagram of an exemplary embodiment of a tilt sensor unit according to the invention.

FIG. 3 shows a block diagram of an exemplary embodiment of a tilt sensor unit 12 according to the invention. The tilt sensor unit 12 shown in FIG. 3 operates as a magnitude-compensated tilt sensor as will be described in detail below. The tilt sensor unit 12 includes a tri-axial tilt sensor 50 as a sensing element. The tri-axial tilt sensor 50 is for example a single-chip tri-axial accelerometer. An example for such a tri-axial accelerometer is the accelerometer chip ADXL330, manufactured by ANALOG DEVICES, INC. The ADXL330 chip is a three-axis acceleration measurement device whose output signals are analog voltages that are proportional to measured accelerations. The accelerometer chip 50 can measure the static acceleration due to gravity as well as dynamic accelerations resulting from motion, shock, or vibration. The tri-axial tilt sensor 50 outputs analog voltages which are proportional to sensed accelerations along the X, Y, and Z axes. When the vehicle 10 is standing still on a level surface, the tri-axial tilt sensor 50 would for example provide an output indicating that there is an acceleration of 1 G (acceleration of gravity) in a direction parallel to the Z-axis.

The tilt sensor unit 12 further includes a microcontroller 52 which is connected to the tri-axial tilt sensor 50 such that the analog output voltages of the tri-axial tilt sensor 50 are fed directly to an analog-to-digital converter system which is preferably built within the microcontroller 52. The microcontroller 52 is for example a C8051F040 microcontroller manufactured by SILICON LABORATORIES, INC. The C8051F040 microcontroller includes a 12-bit analog-to-digital converter system in order to convert the analog output voltages of the tri-axial tilt sensor 50 into digital signals to be processed by the microcontroller 52. The microcontroller 52 is programmed in the programming language C in order to execute the equations described below and to output magnitude-compensated roll and pitch values. The magnitude-compensated roll and pitch values can be used to provide roll and pitch information on the display 14 in real-time.

The tri-axial tilt sensor 50 is a tilt sensing element that is capable of reporting the roll and pitch of its mounting surface. Depending on the orientation of the mounting surface, the X, Y, and Z axes of the tilt sensor 50 may not be aligned with the X, Y, and Z axes of the vehicle 10. Such a mechanical misalignment can be corrected in a calibration step. The tilt sensor 50 may be calibrated such that it will report a zero-degree roll and tilt in an arbitrary mounting orientation. This calibration step is an axes transformation from the relative X, Y, Z directions of the tilt sensor's orientation to the X, Y, Z axes of the vehicle 10. The calibration step thus ensures that the tilt sensor provides pitch and roll information relative to the direction of gravity rather than the orientation of the mounting surface. The tilt sensor 50 and the control electronics including the microcontroller 52 can advantageously be constructed and assembled in an automated process using normal electronics fabrication procedures. The above-mentioned calibration step is preferably performed on the produced tilt sensor unit 12 in order to verify the accuracy of the tilt sensor unit 12. Since the tilt sensor 50 cooperates with the microcontroller, any anomalies or deviations occurring during production can advantageously be repaired by programming changes.

The main sensing element of the tilt sensor 50 preferably uses MEMS (Micro-Electro-Mechanical System) technology for integrating the acceleration sensors and electronic circuitry on a common silicon substrate. The sensing element and control electronics can be constructed and assembled in an automated process using normal electronics fabrication procedures.

The tilt sensor unit 12 shown in FIG. 3 operates as a magnitude-compensated tilt sensor. In order to achieve the magnitude compensation, the method to process tilt angles, i.e. roll angles and pitch angles, requires a sensed magnitude of acceleration effects in the direction of the X, Y, and Z axes. In order to sense the magnitude of acceleration effects in the direction of the X, Y, and Z axes, a single-chip tri-axial accelerometer such as the tri-axial tilt sensor 50 may be used. Alternatively, a combination of dual-axis or single-axis accelerometers, which are mounted such that they are capable of measuring accelerations in the directions of the X, Y, and Z orthogonal axes, may be used. In the embodiment shown in FIG. 3, the sensor data generated by the tri-axial tilt sensor 50 are then fed into the microcontroller 52 for performing the magnitude compensation method described in the following. The microcontroller 52 used in the exemplary embodiment of the invention may be replaced by any computer or computational unit that can perform the method steps for providing magnitude-compensated tilt angles.

For the following equations, the raw sensor data provided by the tri-axial tilt sensor 50 is assumed to be normalized to gravity, such that the accelerations in the direction of the X, Y, and Z axes, namely X_acceleration, Y_acceleration, and Z_acceleration, are in multiples or fractions of G, the acceleration due to gravity, wherein G is approximately 9.81 m/s$^2$. The raw sensor data can be processed to compute the sensed roll and pitch of the tilt sensor unit 12 in an uncompensated format as expressed in the following equations:

$$Roll = YZ\_angle = a\tan2(Y\_acceleration, Z\_acceleration) \times \frac{360}{2\pi} \quad (1)$$

$$Pitch = XZ\_angle = a\tan2(X\_acceleration, Z\_acceleration) \times \frac{360}{2\pi} \quad (2)$$

In the above equation (1) and equation (2), the variables Roll and YZ_angle designate the roll angle about the X-axis, the variables Pitch and XZ_angle designate the pitch angle about the Y-axis. The variables X_acceleration, Y_acceleration, and Z_acceleration designate the accelerations in the X, Y, and Z axes in multiples of G. The function atan2 is the two-parameter function for computing the arctangent in programming languages such as the C programming language.

The magnitude of the sensed acceleration of the uncompensated accelerations measured by the tri-axial tilt sensor 50 is the vector sum of the accelerations in the directions of the X, Y, and Z axes and is expressed in equation (3) below.

$$Magnitude = \sqrt{(X\_acceleration)^2 + (Y\_acceleration)^2 + (Z\_acceleration)^2} \quad (3)$$

The magnitude of the force vector due to gravity, without external accelerations, would be equal to 1 G, i.e. 9.81 m/s$^2$. When an external force acts upon the sensor, the magnitude of the sensed resultant vector changes through superposition. This change of magnitude as defined in equation (4) can then be tracked for the purpose of introducing compensation.

$$\Delta Magnitude = |Magnitude - 1| \quad (4)$$

When the magnitude varies from 1G, it is assumed that an external force is acting on the tri-axial tilt sensor 50. The external force may be caused by vehicle maneuvers, by vibrations or by lateral or centrifugal accelerations. When such external forces are present, the sensor data is known to be inaccurate as far as a determination of a tilt angle is concerned. A tilt angle can be present in the form of a roll angle or a pitch angle or a combination of a roll and a pitch angle. In case such external forces act on the tri-axial tilt sensor 50, it is preferable to discount the current sensor data in favor of the last known accurate values. A compensation factor is introduced for this purpose. In an exemplary embodiment, the compensation factor is a number that has a value of less than 1 and decreases with an increased variance in magnitude. In this exemplary embodiment, the compensation factor may be expressed by the following equation (5).

$$CompensationFactor = \frac{1}{1 + \Delta Magnitude} \quad (5)$$

As mentioned above, the compensation factor defined in equation (5) is only exemplary and is not unique in fitting the above-mentioned criteria. The general concept of using a compensation factor is based on a reliance on past sensor data in the event of a change in magnitude of the sensed gravitational vector. The roll angle Roll(t) and the pitch angle Pitch(t) over time can then be computed with the following equations (6) and (7).

$$Roll(t) = Roll(t-1) \times (1 - CompensationFactor) + YZ\_angle \times (CompensationFactor) \quad (6)$$

$$Pitch(t) = Pitch(t-1) \times (1 - CompensationFactor) + XZ\_angle \times (CompensationFactor) \quad (7)$$

The results of Roll(t) and Pitch(t) are the magnitude-compensated roll and pitch values of the tri-axial tilt sensor 50. The calculation for compensation as defined by the above equations reports the last-known accurate sensor value in the event of a disturbance, which is the desired result in case of a disturbance.

The above-defined method of calculation is suitable for low-cost embedded applications, as it does not require complex computation in real time. An advantage of the method of providing magnitude-compensated roll and pitch values in the manner described above is therefore the low cost when compared to gyroscopically compensated dynamic tilt sensors. A further advantage of the method of providing magnitude-compensated roll and pitch values is the ability to discern inaccurate sensor information and to introduce compensation. Another advantage of the above-defined calculation method is its high accuracy and precision in static situations and its resistance to dynamic disturbances. In summary, the method of providing magnitude-compensated roll and pitch values in the manner described above allows the introduction of a dynamic compensation in low-cost tilt sensor devices. In accordance with a preferred embodiment, a low-cost tilt sensor is used in combination with a magnitude compensation method for computing roll and pitch for real-time automotive applications.

Figure 4:
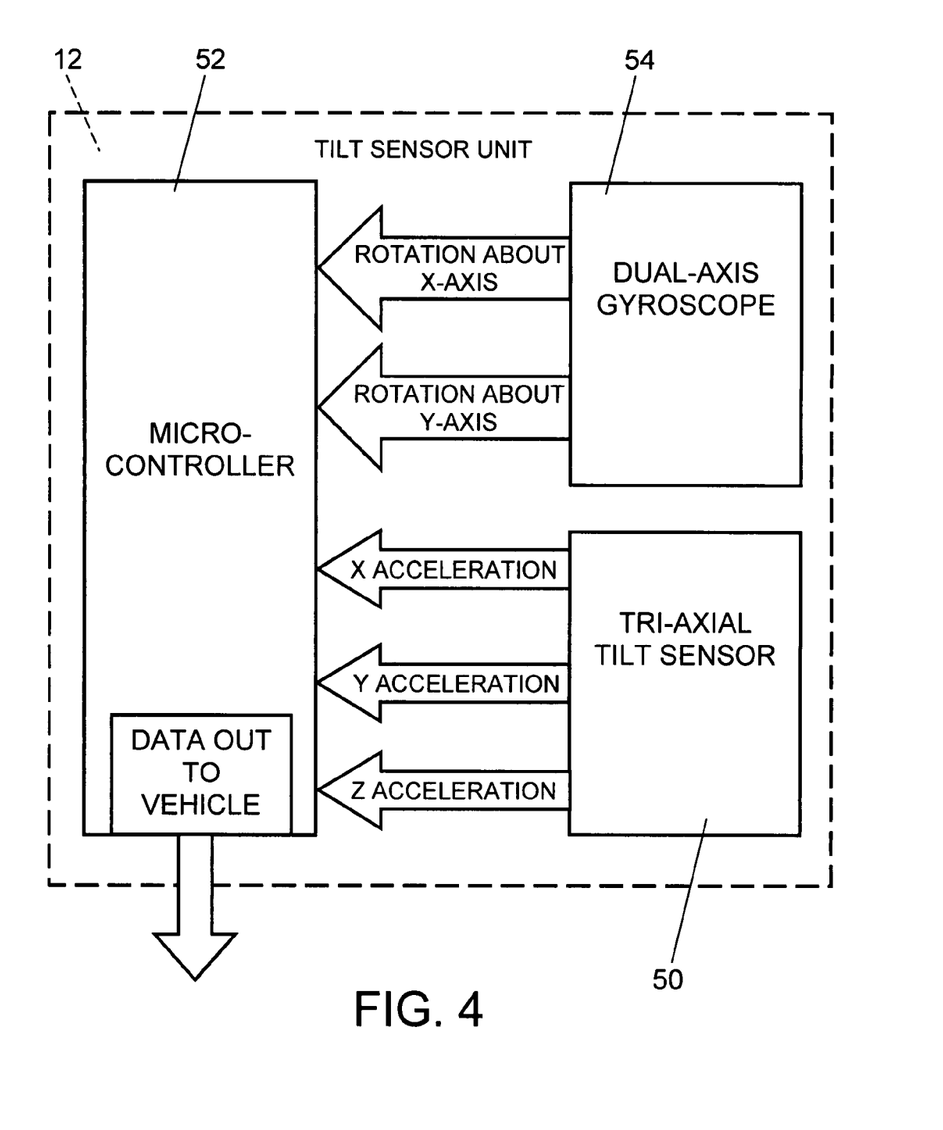
FIG. 4 is a block diagram of a further exemplary embodiment of a tilt sensor unit according to the invention.

The above-described tilt sensor unit 12 as shown in FIG. 3 and the corresponding method of magnitude compensation have the effect of reporting an accurate tilt estimate. However, when the sensor experiences accelerations which vary from 1 G, the tilt sensor unit 12 will report a result using the last-known accurate value, instead of transmitting inaccurate data. The tracking behavior of the magnitude-compensated tilt sensor unit 12 as shown in FIG. 3 can be further improved through the addition of a gyroscopic stabilization. FIG. 4 shows a block diagram of an exemplary embodiment of a tilt sensor unit 12 with an additional gyroscopic stabilization according to the invention. A gyroscope is a device which senses angular speed, or rotation. By integrating an angular speed, the angle traversed by the tilt sensor can be measured. Such a method of integrating angular speed is accurate, but over time is subject to a drift which makes the gyroscopic sensor output unreliable without a fixed reference. Such a fixed reference can be provided by the magnitude-compensation tilt-sensing method as explained above with respect to equations (1) to (7).

The tilt sensor unit 12 shown in FIG. 4 includes a tri-axial tilt sensor 50. Just like in the embodiment shown in FIG. 3, the tri-axial tilt sensor 50 in FIG. 4 is for example a single-chip tri-axial accelerometer such as the accelerometer chip ADXL330, manufactured by ANALOG DEVICES, INC. The tri-axial tilt sensor 50 outputs analog voltages which are proportional to sensed accelerations in the directions along the X, Y, and Z axes. The tilt sensor unit 12 of FIG. 4 further includes a microcontroller 52 which is connected to the tri-axial tilt sensor 50 such that the analog output voltages of the tri-axial tilt sensor 50 are fed directly to an analog-to-digital converter system which is preferably built within the microcontroller 52. The microcontroller 52 is for example a C8051F040 microcontroller manufactured by SILICON LABORATORIES, INC. The C8051F040 microcontroller includes a 12-bit analog-to-digital converter system in order to convert the analog output voltages of the tri-axial tilt sensor 50 into digital signals to be processed by the microcontroller 52. The tilt sensor unit 12 further includes a dual-axis gyroscope 54 which is connected to the microcontroller 52. The dual-axis gyroscope 54 provides angular rate data for a rotation about the X-axis and angular rate data for a rotation about the Y-axis. The output of the dual-axis gyroscope 54 are for example voltages that are proportional to the angular rates of the rotation about the X-axis and the Y-axis. These output voltages are then converted to a digital signal by an analog-to-digital converter system within the microcontroller 52. Alternatively, the dual-axis gyroscope 54 may include an analog-to-digital converter and provide the angular rates in the form of a digital signal.

As described above with respect to FIG. 3, the tri-axial tilt sensor is capable of reporting the roll and pitch of its mounting surface. The tilt sensor 50 is calibrated such that it will report a zero-degree roll and tilt when it is positioned in its mounting orientation. This calibration step is an axes transformation from the relative X, Y, Z directions of the tilt sensor's orientation to the X, Y, Z axes of the vehicle 10. The calibration step ensures that the tilt sensor provides pitch and roll information relative to the direction of gravity rather than the orientation of the mounting surface. The calibration step is preferably performed on the produced tilt sensor unit 12 in order to verify the accuracy of the tilt sensor unit 12. In addition to the calibration step, a correction of anomalies or deviations is preferably performed by programming changes.

Applications for the above-described tilt sensor units include roll over detection for vehicles, augmentation of navigation information with a display of vehicle roll and pitch, hill descent/ascent control with electronic braking, suspension leveling feedback, parking brake force modulation assist, anti-theft systems, vehicle stability information, vibration detection, high accuracy static tilt sensing, road-grade detection for safety electronics. Further applications for the above-described magnitude-compensated tilt sensors include real-time display of roll and tilt information in a vehicle which increases driver awareness of the vehicle state and provides enjoyable metric for off-road enthusiasts.

The method of operation of the tilt sensor unit shown in FIG. 4 is explained in the following. Numerically, the gyroscope data can be utilized by measuring a time period ΔTime, which can be computed by the system clock of the microcontroller 52. By measuring the time and the instantaneous value of the gyroscope data, the change in tilt angle over a time period can be calculated by the following equations.

$$\Delta Roll(t) = XGyroIntegral = \left(\frac{XGyroMeasurement(t) + XGyroMeasurement(t-1)}{2}\right) \times \Delta Time \quad (8)$$

$$\Delta Pitch(t) = YGyroIntegral = \left(\frac{YGyroMeasurement(t) + YGyroMeasurement(t-1)}{2}\right) \times \Delta Time \quad (9)$$

In the above equations, ARoll(t) and XGyroIntegral denote a change in the roll angle during a time interval ΔTime. XGyroMeasurement(t) and XGyroMeasurement(t−1) are the gyroscope measurement data at the time t and, respectively, at the time t−1 for a roll motion about the X-axis of the vehicle 10. ΔPitch(t) and YGyroIntegral denote a change in the pitch angle during a time interval ΔTime. YGyroMeasurement(t) and YGyroMeasurement(t−1) are the gyroscope measurement data at the time t and, respectively, at the time t−1 for a pitch motion about the Y-axis of the vehicle 10.

The measured changes in the roll and pitch value as defined in equations (8) and (9) can be included in the final computation by updating the value to which the tilt sensor unit 12 defaults on inaccurate accelerometer information. The resulting gyroscopically stabilized magnitude compensation equations are defined in the following manner.

Roll(t)=(Roll(t−1)+XGyroIntegral)×(1−CompensationFactor)+YZ_angle×(CompensationFactor) (10)

Pitch(t)=(Pitch(t−1)+YGyroIntegral)×(1−CompensationFactor)+XZ_angle×(CompensationFactor) (11)

The result of the above gyroscopically stabilized magnitude compensation equations (10) and (11) is an accurate estimate of actual sensor roll and pitch angles measured from a gravitational reference. The method described above relies on a highly accurate accelerometer in the form of the tri-axial tilt sensor 50. When the acceleration measurements by the tri-axial tilt sensor 50 provide a measurement that is influenced by lateral or centrifugal accelerations, the tilt sensor unit 12 shown in FIG. 4 relies on the gyroscope data provided by the dual-axis gyroscope 54 and continually updates the output in dependence on the gyroscope data.

Figure 5:
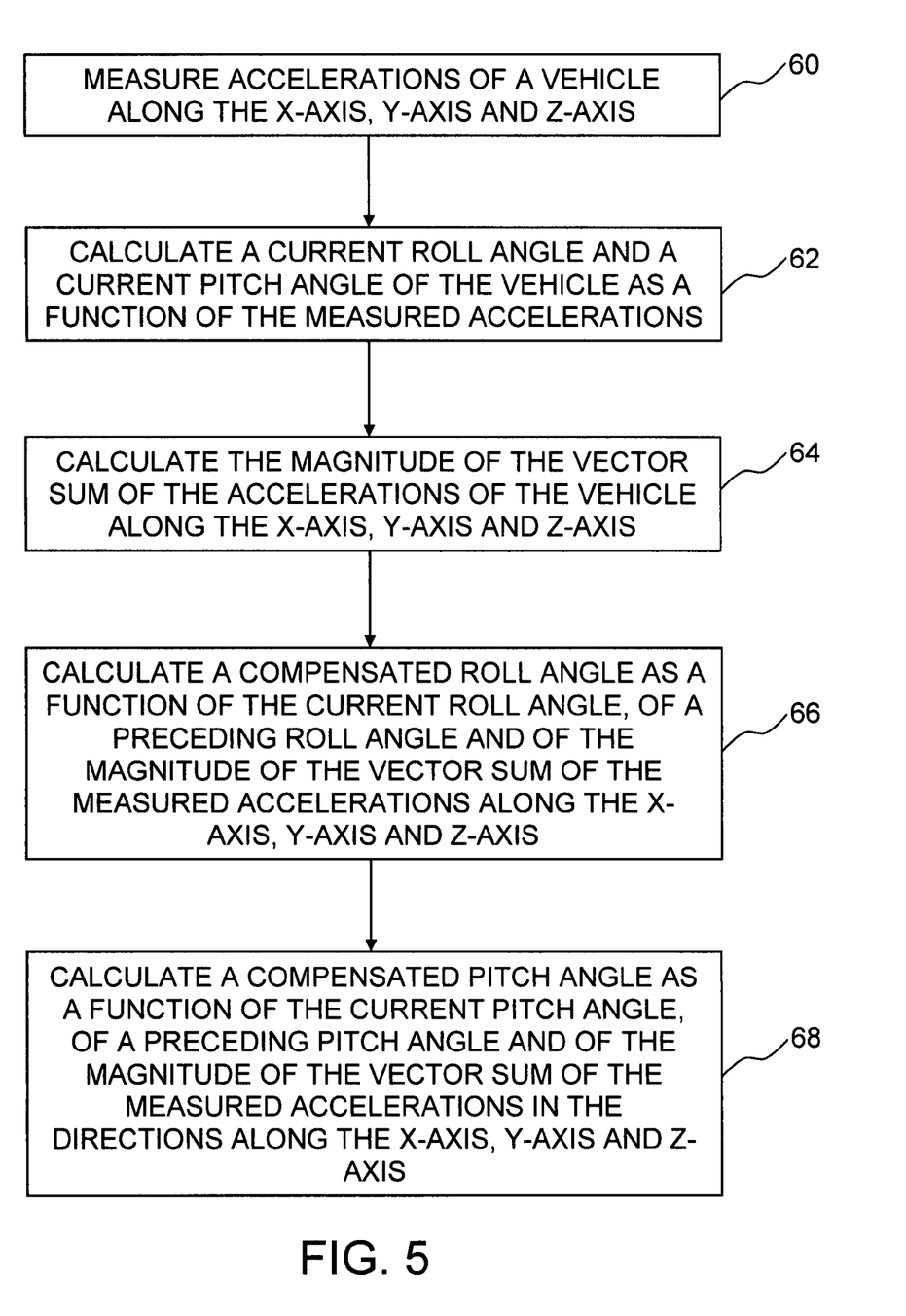
FIG. 5 is a flow chart illustrating main steps of an exemplary mode of the method according to the invention.
Figure 6:
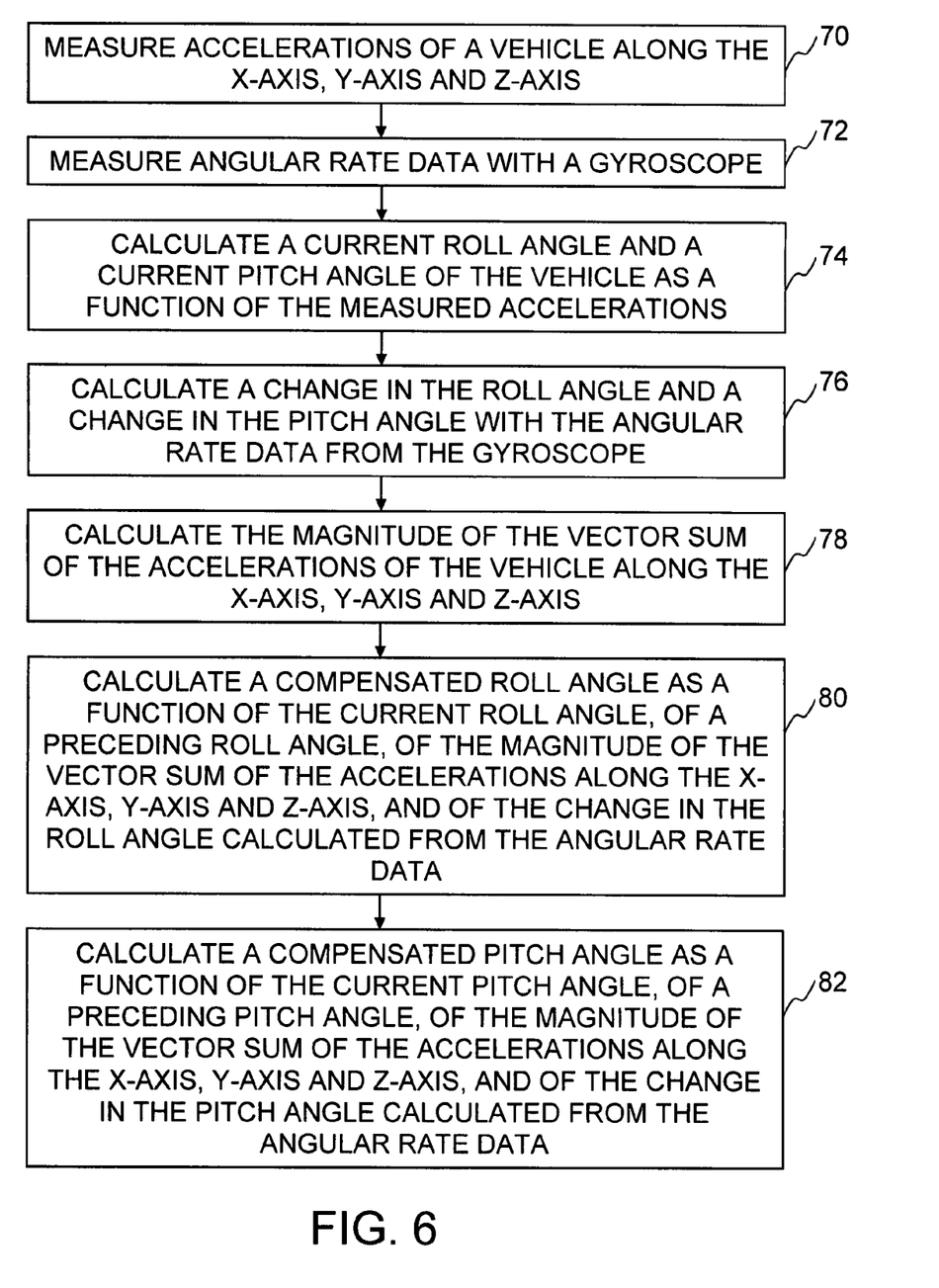
FIG. 6 is a flow chart illustrating main steps of a further mode of the method according to the invention.

FIG. 5 is a flow chart illustrating main steps of an exemplary mode of the method according to the invention. The order of the steps shown in FIGS. 5 and 6 is only exemplary because the calculation steps can be performed in a different order and at least some of the calculation steps could be performed substantially simultaneously. In step 60, accelerations of the vehicle 10 are measured in directions along the X-axis, the Y-axis, and the Z-axis by using the tri-axial tilt sensor 50. In step 62, a current roll angle and a current pitch angle of the vehicle 10 are calculated as a function of the measured accelerations in accordance with equations (1) and (2). In step 64, the magnitude of the vector sum of the accelerations of the vehicle 10 in the directions along the X-axis, the Y-axis, and the Z-axis is calculated in accordance with equation (3). In step 66, the magnitude-compensated roll angle is calculated as a function of the current roll angle, of a preceding roll angle and of the magnitude of the vector sum of the measured accelerations in the directions along the X-axis, the Y-axis, and the Z-axis in accordance with equation (6). In step 68, the magnitude-compensated pitch angle is calculated as a function of the current pitch angle, of a preceding pitch angle and of the magnitude of the vector sum of the measured accelerations in the directions along the X-axis, the Y-axis, and the Z-axis in accordance with equation (7).

FIG. 6 is a flow chart illustrating main steps of a further exemplary mode of the method according to the invention. In step 70, accelerations of the vehicle 10 in directions along an X-axis, a Y-axis, and a Z-axis are measured by using the tri-axial tilt sensor 50. In step 72, angular rates are measured with the dual-axis gyroscope 54. In step 74, a current roll angle and a current pitch angle of the vehicle are calculated as a function of the measured accelerations in accordance with equations (1) and (2). In step 76, a change in the roll angle and a change in the pitch angle over a given time period are calculated by using the angular rate data from the dual-axis gyroscope 54 in accordance with equations (8) and (9). In step 78, the magnitude of the vector sum of the accelerations of the vehicle 10 in the directions along the X-axis, the Y-axis, and the Z-axis is calculated in accordance with equation (3). In step 80, the gyroscopically stabilized magnitude-compensated roll angle is calculated as a function of the current roll angle calculated from the acceleration measurement values, of a preceding roll angle, of the magnitude of the vector sum of the accelerations in the directions along the X-axis, the Y-axis, and the Z-axis, and of the change in the roll angle over the given time period calculated from the angular rate data in accordance with equation (10). In step 82, the gyroscopically stabilized magnitude-compensated pitch angle is calculated as a function of the current pitch angle calculated from the acceleration measurement values, of a preceding pitch angle, of the magnitude of the vector sum of the accelerations in the directions along the X-axis, the Y-axis, and the Z-axis, and of the change in the pitch angle over the given time period calculated from the angular rate data in accordance with equation (11).

What is claimed is:

1. A method for determining a tilt angle of a vehicle, the method comprising:
   providing acceleration measurement values by measuring accelerations of the vehicle in directions along an X-axis, a Y-axis, and a Z-axis, the X-axis, the Y-axis, and the Z-axis being substantially perpendicular with respect to one another;
   calculating a current tilt angle of the vehicle as a function of the acceleration measurement values;
   calculating a magnitude of a vector sum of the accelerations of the vehicle in the directions along the X-axis, the Y-axis, and the Z-axis; and
   calculating a compensated tilt angle as a function of the current tilt angle, which is calculated from the acceleration measurement values, of at least one preceding tilt angle, and of the magnitude of the vector sum of the accelerations in the directions along the X-axis, the Y-axis, and the Z-axis such that the at least one preceding tilt angle is used for calculating the compensated tilt angle if the magnitude of the vector sum of the accelerations in the directions along the X-axis, the Y-axis, and the Z-axis is substantially different from a magnitude of a gravitational acceleration.

2. The method according to claim 1, which comprises:
measuring the accelerations of the vehicle in directions along the X-axis, the Y-axis, and the Z-axis such that the X-axis is substantially parallel to a longitudinal axis of the vehicle, the Y-axis is substantially parallel to a transverse axis of the vehicle and the Z-axis is substantially parallel to a vertical axis of the vehicle; and
calculating the current tilt angle of the vehicle as a function of the acceleration measurement values by calculating a current roll angle as a function of accelerations of the vehicle in directions along the Y-axis and along the Z-axis and by calculating a current pitch angle as a function of accelerations of the vehicle in directions along the X-axis and along the Z-axis.

3. The method according to claim 2, which comprises:
calculating the compensated tilt angle by calculating a compensated roll angle and a compensated pitch angle;
calculating the compensated roll angle as a function of the current roll angle, of at least one preceding roll angle and of the magnitude of the vector sum of the accelerations in the directions along the X-axis, the Y-axis, and the Z-axis; and
calculating the compensated pitch angle as a function of the current pitch angle, of at least one preceding pitch angle and of the magnitude of the vector sum of the accelerations in the directions along the X-axis, the Y-axis, and the Z-axis.

4. The method according to claim 3, which comprises:
using a gyroscope for providing angular rate data;
calculating a change in a roll angle and a change in a pitch angle over a given time period by using the angular rate data provided by the gyroscope;
calculating the compensated roll angle as a function of the current roll angle, which is calculated from the acceleration measurement values, of at least one preceding roll angle, of the magnitude of the vector sum of the accelerations in the directions along the X-axis, the Y-axis, and the Z-axis, and of the change in the roll angle over the given time period, which is calculated from the angular rate data, such that the at least one preceding roll angle and the change in the roll angle over the given time period are used for calculating the compensated roll angle if the magnitude of the vector sum of the accelerations in the directions along the X-axis, the Y-axis, and the Z-axis is substantially different from the magnitude of the gravitational acceleration; and
calculating the compensated pitch angle as a function of the current pitch angle, which is calculated from the acceleration measurement values, of at least one preceding pitch angle, of the magnitude of the vector sum of the accelerations in the directions along the X-axis, the Y-axis, and the Z-axis, and of the change in the pitch angle over the given time period, which is calculated from the angular rate data, such that the at least one preceding pitch angle and the change in the pitch angle over the given time period are used for calculating the compensated pitch angle if the magnitude of the vector sum of the accelerations in the directions along the X-axis, the Y-axis, and the Z-axis is substantially different from the magnitude of the gravitational acceleration.

5. The method according to claim 3, which comprises:
calculating the compensated roll angle and the compensated pitch angle by using the following relations:

Roll($t$)=Roll($t$−1)×(1−CompensationFactor)+YZ_angle×(CompensationFactor)

and

Pitch($t$)=Pitch($t$−1)×(1−CompensationFactor)+XZ_angle×(CompensationFactor)

wherein Roll(t) denotes the compensated roll angle, Pitch(t) denotes the compensated pitch angle, Roll(t−1) denotes a preceding roll angle, Pitch(t−1) denotes a preceding pitch angle, YZ_angle denotes the current roll angle which is a function of accelerations of the vehicle in directions along the Y-axis and along the Z-axis, XZ_angle denotes the current pitch angle which is a function of accelerations of the vehicle in directions along the X-axis and along the Z-axis, and CompensationFactor denotes a compensation factor having a value in a range between zero and one.

6. The method according to claim 5, which comprises:
calculating the compensation factor by using the following relations:

$$\text{Magnitude} = \sqrt{(X\_acceleration)^2 + (Y\_acceleration)^2 + (Z\_acceleration)^2}$$

and $$CompensationFactor = \frac{1}{1 + |Magnitude - 1|}$$

wherein Magnitude denotes the magnitude of the vector sum of the accelerations in the directions along the X-axis, the Y-axis, and the Z-axis, wherein X_acceleration, Y_acceleration, and Z_acceleration denote respective accelerations along the X-axis, the Y-axis and the Z-axis in multiples of the magnitude of the gravitational acceleration.

7. The method according to claim 4, which comprises:
calculating the compensated roll angle and the compensated pitch angle by using the following relations:

Roll($t$)=(Roll($t$−1)+XGyroIntegral)×(1−CompensationFactor)+YZ_angle×(CompensationFactor)

and

Pitch($t$)=(Pitch($t$−1)+YGyroIntegral)×(1−CompensationFactor)+XZ_angle×(CompensationFactor)

wherein Roll(t) denotes the compensated roll angle, Pitch(t) denotes the compensated pitch angle, Roll(t−1) denotes a preceding roll angle, Pitch(t−1) denotes a preceding pitch angle, YZ_angle denotes the current roll angle which is a function of accelerations of the vehicle in directions along the Y-axis and along the Z-axis, XZ_angle denotes the current pitch angle which is a function of accelerations of the vehicle in directions along the X-axis and along the Z-axis, XGyroIntegral and YGyroIntegral denote a respective change in the roll angle and the pitch angle over the given time period as a function of the angular rate data provided by the gyroscope.

8. The method according to claim 7, which comprises:
calculating the change in the roll angle and the change in the pitch angle over the given time period by using the following relations:

$$XGyroIntegral = \left( \frac{XGyroMeasurement(t) + XGyroMeasurement(t-1)}{2} \right) \times \Delta Time$$

and $$YGyroIntegral = \left(\frac{YGyroMeasurement(t) + YGyroMeasurement(t-1)}{2}\right) \times \Delta Time \quad \quad 5$$

wherein XGyroIntegral denotes the change in the roll angle over the given time period ΔTime, YGyroIntegral denotes the change in the pitch angle over the given time period ΔTime, XGyroMeasurement(t), XGyroMeasurement(t−1), YGyroMeasurement(t), and YGyroMeasurement(t−1) are angular rate data provided by the gyroscope.

9. The method according to claim 7, which comprises: calculating the compensation factor by using the following relations:

$$Magnitude = \sqrt{(X\_acceleration)^2 + (Y\_acceleration)^2 + (Z\_acceleration)^2}$$

and $$CompensationFactor = \frac{1}{1 + |Magnitude - 1|}$$

wherein Magnitude denotes the magnitude of the vector sum of the accelerations in the directions along the X-axis, the Y-axis, and the Z-axis, wherein X_acceleration, Y_acceleration, and Z_acceleration denote respective accelerations along the X-axis, the Y-axis and the Z-axis in multiples of the magnitude of the gravitational acceleration.

10. The method according to claim 1, which comprises displaying tilt angle information by displaying roll angle information and pitch angle information on a display in the vehicle.

* * * * *